United States Patent
Polozoff et al.

(10) Patent No.: US 8,478,985 B2
(45) Date of Patent: *Jul. 2, 2013

(54) DETERMINING WHETHER TO ENCRYPT OUTBOUND TRAFFIC

(75) Inventors: Alexandre Polozoff, Bloomington, IL (US); Kulvir Singh Bhogal, Fort Worth, TX (US)

(73) Assignee: International Business Machines Corporation, Armonk, NY (US)

( * ) Notice: Subject to any disclaimer, the term of this patent is extended or adjusted under 35 U.S.C. 154(b) by 728 days.

This patent is subject to a terminal disclaimer.

(21) Appl. No.: 12/137,946

(22) Filed: Jun. 12, 2008

(65) Prior Publication Data

US 2008/0240436 A1    Oct. 2, 2008

Related U.S. Application Data

(63) Continuation of application No. 11/109,099, filed on Apr. 19, 2005, now abandoned.

(51) Int. Cl.
*H04L 9/00*    (2006.01)

(52) U.S. Cl.
USPC ........... 713/153; 713/160; 713/168; 713/189; 713/190; 713/191; 713/192; 713/193; 713/150; 713/162; 713/181; 709/231; 709/238; 709/247; 709/245; 709/240; 380/37; 380/42; 380/258

(58) Field of Classification Search
USPC .......................................... 380/255
See application file for complete search history.

(56) References Cited

U.S. PATENT DOCUMENTS

| | | | |
|---|---|---|---|
| 5,228,083 A | 7/1993 | Lozowick et al. | |
| 5,548,646 A * | 8/1996 | Aziz et al. | 713/153 |
| 5,835,726 A | 11/1998 | Shwed et al. | |
| 5,978,918 A | 11/1999 | Scholnick et al. | |
| 6,092,191 A * | 7/2000 | Shimbo et al. | 713/153 |
| 6,182,226 B1 * | 1/2001 | Reid et al. | 726/15 |
| 6,708,218 B1 | 3/2004 | Ellington, Jr. et al. | |
| 7,181,506 B1 * | 2/2007 | Vigue et al. | 709/219 |
| 2001/0034792 A1 | 10/2001 | Swildens | |
| 2002/0129243 A1 * | 9/2002 | Nanjundiah | 713/160 |
| 2003/0110255 A1 * | 6/2003 | Tarquini et al. | 709/224 |
| 2004/0114634 A1 * | 6/2004 | Liu | 370/521 |

* cited by examiner

*Primary Examiner* — Nathan Flynn
*Assistant Examiner* — Bryan Wright
(74) *Attorney, Agent, or Firm* — Yee & Associates, P.C.; David A. Mims

(57) ABSTRACT

An improved method, apparatus, and computer instructions for processing outbound traffic passing through a port. This port is for a server and receives a request from a client. The request includes a universal resource identifier to a destination. A determination is made as to whether the request requires encryption using the universal resource identifier in the request. The request is sent through the port to the destination in an encrypted form, in response to a determination that the request requires encryption.

19 Claims, 4 Drawing Sheets

DETERMINING WHETHER TO ENCRYPT OUTBOUND TRAFFIC

This application is a continuation of application Ser. No. 11/109,099, filed Apr. 19, 2005, status abandoned.

BACKGROUND OF THE INVENTION

1. Technical Field

The present invention relates generally to a data processing system, and in particular, to a method and apparatus for processing data. Still, more particularly, the present invention provides an improved method, apparatus, and computer instruction for managing transfer of data in a network.

2. Description of Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet Protocol (TCP/IP).

The Internet has revolutionized both communications and commerce, as well as, being a source of both information and entertainment. For many users, e-mail is a widely used format to communicate over the Internet. Additionally, the Internet is also used for real-time voice conversations.

With respect to transferring data over the Internet, the World Wide Web environment is used. This environment also is referred to simply as "the Web". The Web is a mechanism used to access information over the Internet. In the Web environment, servers and clients effect data transaction using the hypertext transfer protocol (HTTP), a known protocol for handling the transfer of various data files, such as text files, graphic images, animation files, audio files, and video files.

On the Web, the information in various data files is formatted for presentation to a user by a standard page description language, the hypertext markup language (HTML). Documents using HTML also are referred to as Web pages. Web pages are connected to each other through links or hyperlinks. These links allow for a connection or link to other Web resources identified by a universal resource identifier (URI), such as a uniform resource locator (URL).

A browser is a program used to look at and interact with all of the information on the Web. A browser is able to display Web pages and to traverse links to other Web pages. Resources, such as Web pages, are retrieved by a browser, which is capable of submitting a request for the resource. This request typically includes an identifier, such as, for example, a URL. As used herein, a browser is an application used to navigate or view information or data in any distributed database, such as the Internet or the World Wide Web. A user may enter a domain name through a graphical user interface (GUI) for the browser to access a source of content. The domain name is automatically converted to the IP address by a domain name server (DNS), which is a service that translates the symbolic name entered by the user into an IP address by looking up the domain name in a database.

Users employ browsers to access data on the Web. Additionally, these browsers and other programs are used in business transactions. For example, a user may purchase goods or services from a business through a Website. Often times in retrieving data or completing a business transaction, the traffic is required to be encrypted to provide for maintaining the security and confidentiality of the information. In purchasing goods or services, the user may provide bank account information or credit card information for payment. Clearly, the user only wants the business offering the goods or services to see this information. In another example, a user may access personal medical information from a hospital Website. This information also is sent in an encrypted form. One encryption scheme is secure sockets layer (SSL). This standard is a widely used security protocol on the Internet. SSL is used to securely send credit card and other sensitive data to a business' Web site.

Various network appliances are employed to accept inbound encrypted traffic on a specific port. This port may be configured to either end the outbound traffic from a network appliance in an encrypted form or an unencrypted form. Mixing of encrypted and unencrypted outbound traffic cannot occur with currently available network appliances. These appliances include, for example, load balancers, routers, and firewalls. In some situations, such as in an enterprise environment, different types of traffic flow over an internal firewall protected network. Some of the traffic may not need encryption. For example, all traffic with passwords may need encryption while other forms of traffic do not need encryption.

Currently, the different types of traffic flow through different network routes or paths in which some are totally encrypted while others are unencrypted. This type of architecture results in higher capital expenditures, as well as, increased administration and network management.

Therefore, it would be advantageous to have an improved method, apparatus, and computer instructions for encrypting and unencrypting traffic in a network appliance.

SUMMARY OF THE INVENTION

The present invention provides an improved method, apparatus, and computer instructions for processing outbound traffic passing through a port. This port is for a server and receives a request from a client. The request includes a universal resource identifier to a destination. A determination is made as to whether the request requires encryption using the universal resource identifier in the request. The request is sent through the port to the destination in an encrypted form, in response to a determination that the request requires encryption.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
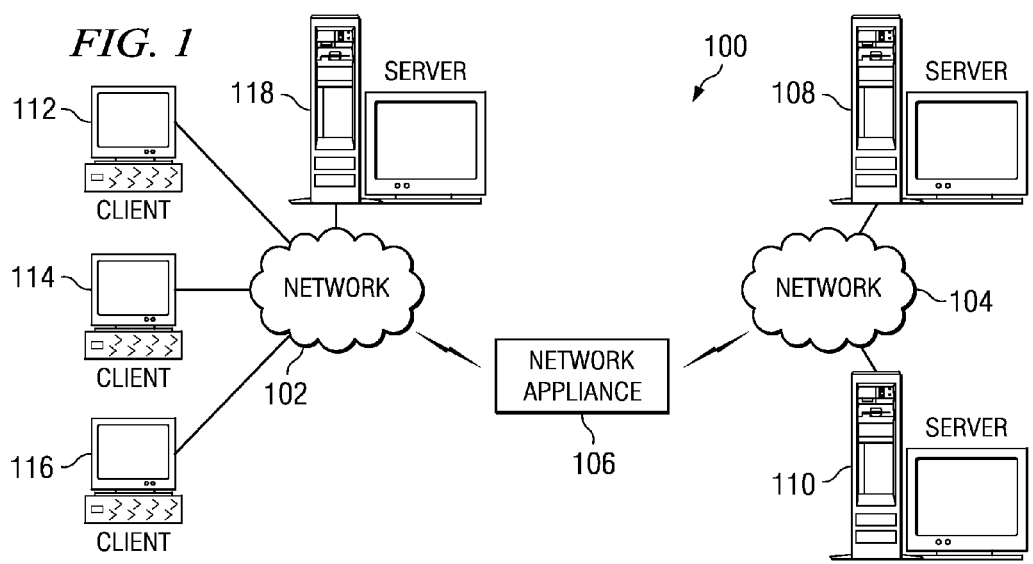
FIG. 1 is a diagram illustrating a network data processing system, in which the present invention may be implemented.

With reference now to the figures, and in particular with reference to FIG. 1, this figure is a diagram illustrating a network data processing system in which the present invention may be implemented. Network data processing system 100 is a network of computers in which the present invention may be implemented. Network data processing system 100 contains network 102 and network 104. These two networks are connected to one another through network appliance 106. These components are for the medium used to provide communications links between various devices and computers connected together within network data processing system 100. Networks 102 and 104 may include connections, such as wire, wireless communication links, or fiber optic cables.

In this illustrative example, network 104 contains server 108 and server 110. These servers in network 104 may be, for example, in a local area network (LAN) for an enterprise or business. Network 102 contains client 112, 114, and 116, along with server 118. These two networks may be part of the Internet in these examples. Network appliance 106 provides a connection between network 102 and network 104. In these examples, network appliance 106 is a device that accepts inbound traffic on a port and may send the outbound traffic in an encrypted or unencrypted form through the same port. Network appliance 106 may be, for example, a load balancer, a firewall, or a router. Network appliance 106 includes a mechanism used to selectively encrypt traffic through a port such that encrypted and unencrypted traffic flow through the same port.

Figure 2:
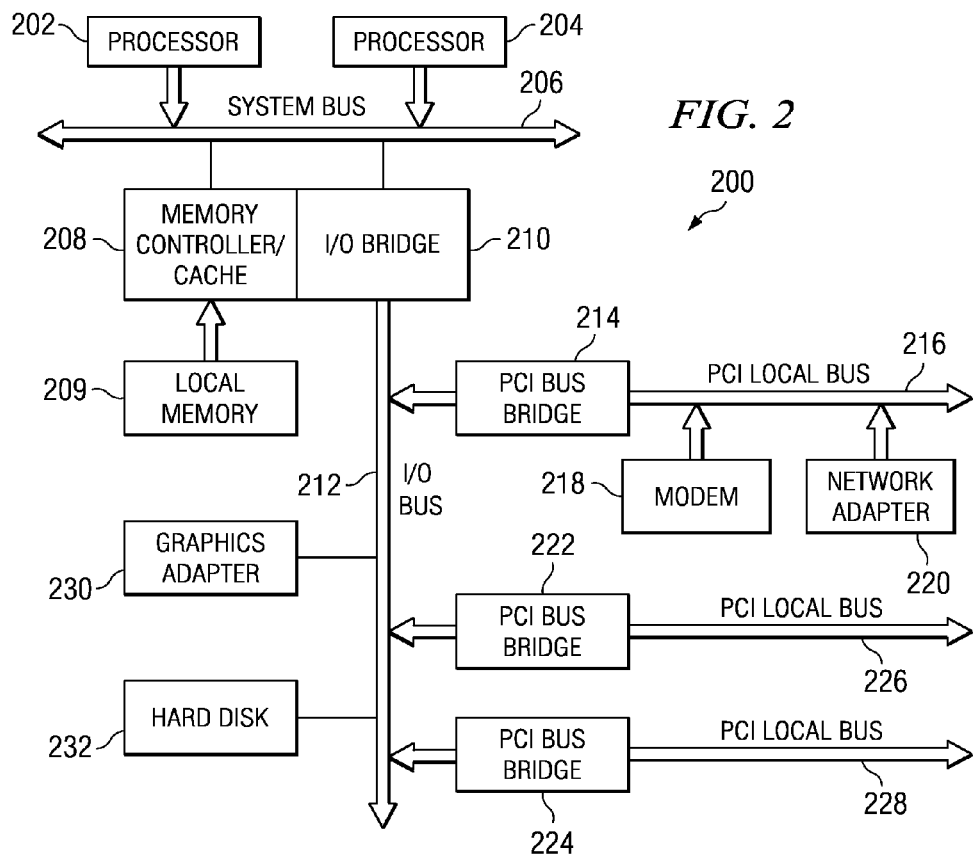
FIG. 2 is a block diagram of a data processing system that may be implemented as a server in accordance with a preferred embodiment of the present invention.

FIG. 2 is a block diagram of a data processing system that may be implemented as a server, such as server 108 in FIG. 1, in accordance with a preferred embodiment of the present invention. Further, data processing system 200 may be used to implement a network appliance, such as network appliance 106 in FIG. 1.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 connects to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
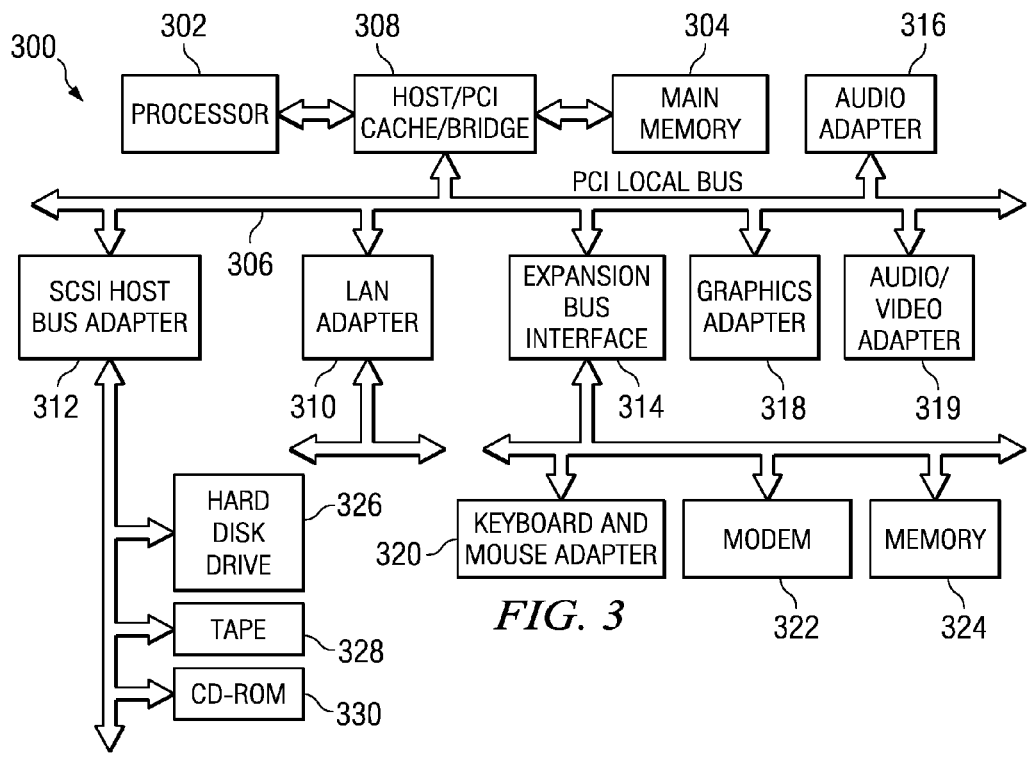
FIG. 3 is a block diagram illustrating a data processing system in which the present invention may be implemented.

FIG. 3 is a block diagram illustrating a data processing system in which the present invention may be implemented. Data processing system 300 is an example of a client computer, such as client 112 in FIG. 1. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 connects to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 connect to PCI local bus 306 by direct component connection. In contrast, audio adapter 316, graphics adapter 318, and audio/video adapter 319 connect to PCI local bus 306 by add-in boards inserted into expansion slots. Expansion bus interface 314 connects to a keyboard and mouse adapter 320, modem 322, and additional memory 324. SCSI host bus adapter 312 connects to hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. Applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
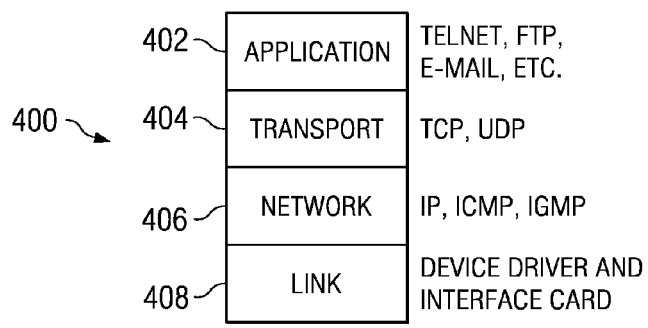
FIG. 4 is a diagram of a transmission control protocol/Internet protocol (TCP/IP) and similar protocols in accordance with a preferred embodiment of the present invention.

FIG. 4 is a diagram of a transmission control protocol/Internet protocol (TCP/IP) and similar protocols in accordance with a preferred embodiment of the present invention. TCP/IP and similar protocols are utilized by communications architecture 400. In this example, communications architecture 400 is a 4-layer system. This architecture includes application layer 402, transport layer 404, network layer 406, and link layer 408. Each layer is responsible for handling various communications tasks. Link layer 408 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 406 also is referred to as the Internet layer and handles the movement of packets of data around the network. For example, network layer 406 handles the routing of various packets of data that are transferred over the network. Network layer 406 in the TCP/IP suite is comprised of several protocols, including Internet protocol (IP), Internet control message protocol (ICMP), and Internet group management protocol (IGMP).

Next, transport layer 404 provides an interface between network layer 406 and application layer 402 that facilitates the transfer of data between two host computers. Transport layer 404 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, TCP and User datagram protocol (UDP). TCP provides reliability services to ensure that data is properly transmitted between two hosts, including dropout detection and retransmission services.

Conversely, UDP provides a much simpler service to the application layer by merely sending packets of data called datagrams from one host to the other, without providing any mechanism for guaranteeing that the data is properly transferred. When using UDP, the application layer must perform the reliability functionality.

Application layer 402 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

The mechanism of the present invention may be more specifically implemented in a layer, such as transport layer 404 or network layer 406 in these examples. This layer examines requests received in inbound traffic and determines whether the request should be relayed in outbound traffic in an encrypted or unencrypted form. In these illustrative examples, a request contains a fully qualified universal resource locator (URL). A fully qualified URL contains a host name, as well as, the context. An example of a fully qualified URL is www.ibm.com/tech. The host name is "ibm.com", while the context is "tech" in this illustrative example. Depending on the particular implementation, the request may contain just the host name, rather than a fully qualified URL.

Figure 5:
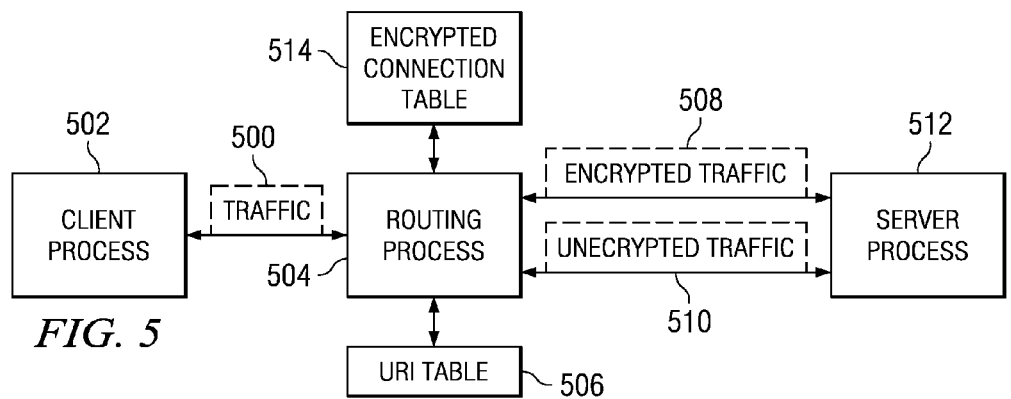
FIG. 5 is a diagram of components used in selectively encrypting traffic flowing through a port in accordance with a preferred embodiment of the present invention.

FIG. 5 is a diagram of components used in selectively encrypting traffic flowing through a port in accordance with a preferred embodiment of the present invention. In this example, traffic 500 is sent between client process 502 and routing process 504. Traffic 500 may be unencrypted traffic or encrypted traffic. Client process 502 may be, for example, a browser executing on a client, such as client 112 in FIG. 1. Routing process 504 may be, for example, a process running on a device, such as network appliance 106 in FIG. 1. More specifically, routing process 504 may be located in transport layer 404 or network layer 406 in FIG. 4. In this illustrative example, routing process 504 routes traffic for a single port. This port may be a logical port or a physical port.

Routing process 504 employs URI table 506 to determine whether inbound traffic from client process 502 is to be sent as encrypted traffic 508, or unencrypted traffic 510 to server process 512. In this example, URI table 506 is a table of URLs. Of course, URI table 506 may take other form depending on the particular implementation. For example, URI table 506 may contain universal resource names (URNs) instead of URLs. URNs use regular words that are protocol and location independent. URNs provide a higher level of abstraction. URNs are persistent (never change) and require a resolution service similar to the domain name system (DNS) to convert names into real addresses. Further, URI table 506 may contain multiple types of URIs, such as URLs and URNs.

When traffic 500 takes the form of incoming traffic such as a request from a client to a server, routing process 504 identifies the URL in the request. Routing process 504 compares this URL with URLs in URI table 506 to determine whether a match is present. In this example, a match indicates that the outbound traffic from routing process 504 to server process 512 should take the form of encrypted traffic 508. In other words, if the request in traffic 500 is unencrypted, routing process 504 encrypts the request. Determining whether traffic 500 is encrypted may be performed using a number of different mechanisms. For example, if traffic 500 is using an SSL connection that is received at the port typically used for this type of connection, the traffic coming through that port is identified as being encrypted. As another example, header information in traffic 500 may be examined by routing process 504 to determine whether traffic 500 is encrypted. In some cases, encryption protocols include information in headers in the traffic that may be used to determine whether the traffic is encrypted. Further, particular ports may be identified ahead of time as ports that will be used for encrypted traffic.

If the request was received in an encrypted form, routing process 504 routes the request to server process 512 in the encrypted form. The connection for this request is recorded in encrypted connection table 514.

In these illustrative examples, the encryption takes the form of SSL. Although SSL is used in these examples, other types of security protocol may be used to encrypt traffic to form encrypted traffic 508. For example, secure hypertext transfer protocol (SHTTP) or IP Security Protocol (IPSEC) may be used as the security protocol for encrypting traffic.

On the other hand, if the URL is not found in URI table 506, encryption of the request is not necessary. Routing process 504 sends the request in an unencrypted form as unencrypted traffic 510 to server process 512.

When routing process 504 receives incoming traffic from server process 512, routing process 504 identifies existing connection information for this traffic if the incoming traffic is in an unencrypted form such as unencrypted traffic 510. This incoming traffic may be, for example, a response to the request. Routing process 504 compares the connection with existing connections recorded in encrypted connection table 514. If the connection is located within this table, routing process 504 encrypts the unencrypted response and returns this response to client 502 in traffic 500. In this example, the client has sent a request in an encrypted form and routing process 504 returns the response in traffic 500 to client 502 in the same form. However, depending on the particular implementation, the response could be returned in an unencrypted form. In this manner, the mechanism of the present invention allows for selectively encrypting traffic passing through a port in a network appliance.

Figure 6:
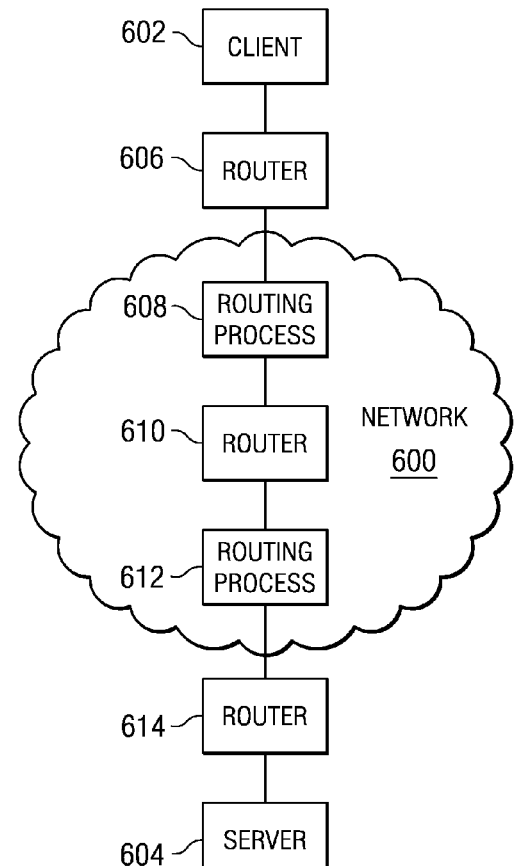
FIG. 6 is a diagram of components used in selectively encrypting traffic flowing through a port in accordance with a preferred embodiment of the present invention.

FIG. 6 is a diagram of components used in selectively encrypting traffic flowing through a port in accordance with a preferred embodiment of the present invention. In this illustrative example, traffic is sent between client 602 and server 604, in examining this traffic between these two nodes, the traffic flows through router 606, routing process 608, router 610, routing process 612, and router 614. Routing process 608 and routing process 612 along with router 610 are located within network 600. Network 600 may be, for example, a wider remote network or a local area network. Routing process 608 and routing process 612 contain the processes of the present invention in these illustrative examples. These components contain processes similar to those found in routing process 404 in FIG. 4.

In a network flow, the routes between routing processes 608 and 612 could flow over a third-party network commonly known as a Wide Area Network (WAN). These routing processes, in this example, are located in routers within network 600. Wide Area Networks typically interconnect distant divisions of the same organization with locations in various cities around the world. WANs are typically provided by third-party organizations. The third-party provider controls the connections and routes within the WAN. In most cases, the network traffic for each of the third-party provider customers is isolated on different links. However, the network traffic flowing through the WAN is visible to anyone working within the third-party provider WAN. In these cases, the organization using the WAN has no control over who can see the network traffic flowing between routing processes 608 and 612.

The traffic from client 602 to routing process 608 can flow unencrypted because this traffic is on the internal LAN. In order to protect information flowing across the WAN, routing process 608 is configured to encrypt certain URLs deemed to contain sensitive information the organization does not want exposed to the WAN provider. Routing process 612 may exchange traffic with server 604 in either an encrypted or unencrypted form depending on the network configuration. For example, if server 604 is on an internal LAN, routing process 612 does not have to encrypt those URI's. Therefore, routing process 612 does not necessarily have the same configuration as routing process 608.

On the reverse network flow from server 604, routing process 612 compares the responses connection (see FIG. 9) and either encrypts or does not encrypt the response traffic on existing connections back to routing process 608. Routing process 608 networks traffic back to client 602. Client 602 is sent traffic based on the existing encrypted or unencrypted connections.

Figure 7:
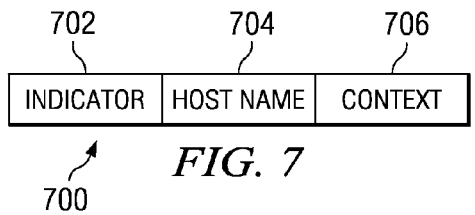
FIG. 7 is a diagram of an entry in a URI table in accordance with a preferred embodiment of the present invention.

FIG. 7 is a diagram of an entry in a URI table in accordance with a preferred embodiment of the present invention. In this example, entry 700 is an entry found in a table, such as URI table 506 in FIG. 5. Entry 700 contains indicator 702 and a URL that contains host name 704 and context 706. In this illustrative example, the URL is a qualified URL. Indicator 702 is used to identify the URL in entry 700 as one that requires encryption.

Figure 8:
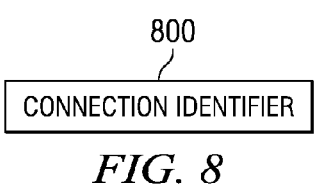
FIG. 8 is a diagram of an entry in an encrypted connection table in accordance with a preferred embodiment of the present invention.

FIG. 8 is a diagram of an entry in an encrypted connection table in accordance with a preferred embodiment of the present invention. Entry 800 is an example of an entry in an encrypted connection table, such as encrypted connection table 514 in FIG. 5. In this example, entry 800 contains a connection identifier. As used in these examples, a connection identifier may include any information that uniquely identifies the connection. For example, this information may include an end point IP address, a port identifier, and a processor thread that receives the connection in the network appliance. Of course, other information also may be used in the connection identifier.

Figure 9:
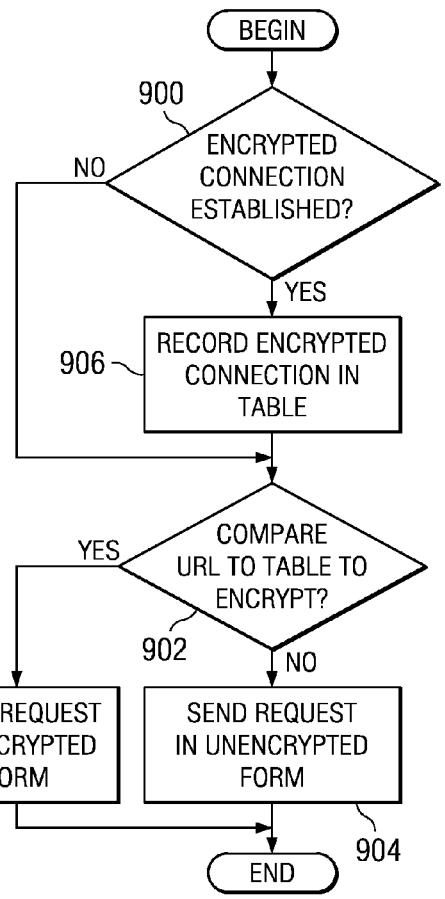
FIG. 9 is a flowchart of a process for selectively encrypting traffic received from a client in accordance with a preferred embodiment of the present invention.

FIG. 9 is a flowchart of a process for selectively encrypting traffic received from a client in accordance with a preferred embodiment of the present invention. The process illustrated in FIG. 9 may be implemented in a process, such as routing process 504 in FIG. 5.

The process begins by determining whether an encrypted connection has been established (step 900). If an encrypted connection is not present, a determination is made as to whether the request should be encrypted by comparing the URL to a table, such as URI table 506 in FIG. 5 (step 902). If the request is not to be encrypted, the process sends the request in an unencrypted form (step 904) with the process terminating thereafter.

Turning back to step 900, if an encrypted connection is present, the process records the encrypted connection in the table (step 906) with the process proceeding to step 902 to compare the URL to the table to encrypt. In step 906, the information for this request is recorded such that additional traffic on this connection remains encrypted.

Turning back now to step 902, if the request is to be sent in encrypted form, the process sends the request in this form (step 908) with the process terminating thereafter.

Figure 10:
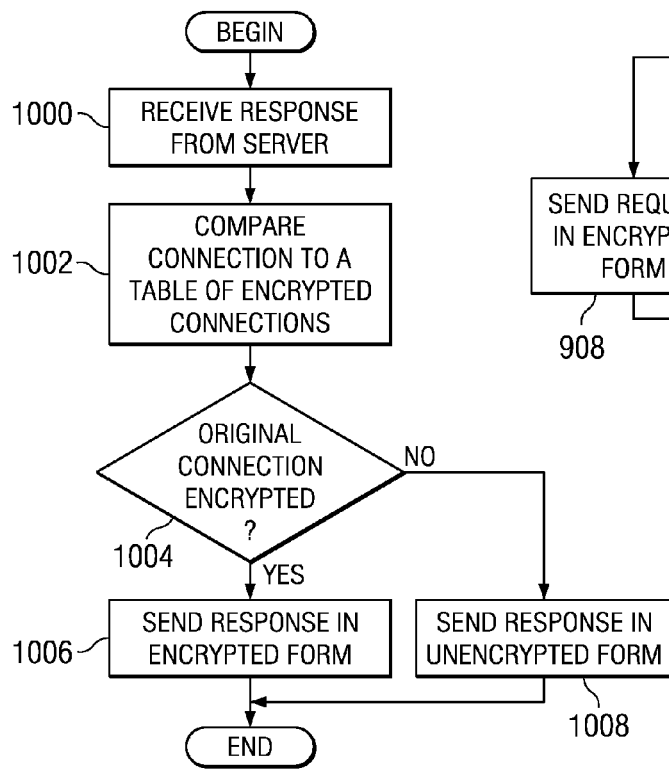
FIG. 10 is a flowchart of a process for selectively encrypting traffic received from a server in accordance with a preferred embodiment of the present invention.

FIG. 10 is a flowchart of a process for selectively encrypting traffic received from a server in accordance with a preferred embodiment of the present invention. The process illustrated in FIG. 10 may be implemented in a process, such as routing process 504 in FIG. 5.

The process begins by receiving a response from a server (step 1000). The connection for this response is compared to a table of encrypted connections (step 1002). This table may be, for example, encrypted connection table 514 in FIG. 5. Next, a determination is made as to whether the original connection was encrypted (step 1004). This determination is used to ensure that responses returned to a client are returned in the same form as received from the client. For example, if the original connection was encrypted, all responses are returned in an encrypted form. This particular process does not rely on the URI. If the original connection was encrypted, the process sends a response in encrypted form (step 1006), with the process terminating thereafter.

With reference again to step 1004, if the original connection was not encrypted, the process sends the response in unencrypted form (step 1008), thus ending the process.

Thus, the present invention provides an improved method, apparatus, and computer instructions for selectively encrypting traffic. The mechanism of the present invention allows for both encrypted and unencrypted traffic to pass through the same port. This mechanism compares the URI in incoming traffic, such as a request from a client, to a set of URIs. If a match is present, the request is sent in the outbound traffic to a server in an encrypted form. If a match is absent, the traffic is sent in an unencrypted form. In this manner, the amount of capital expenditures and management of resources is reduced by decreasing the number of paths needed to route encrypted and unencrypted traffic as compared to currently available routing systems in network appliances.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing outbound traffic passing through a port, the method comprising:
   receiving a request from a client for a server at the port, wherein the request includes a universal resource identifier to a destination;
   identifying whether the universal resource identifier to the destination identifies a location on a local area network;
   responsive to identifying that the universal resource identifier to the destination identifies a location on a local area network, sending the request through the port to the destination in an unencrypted form;
   identifying whether the port utilizes a secure sockets layer connection;
   responsive to identifying that the port utilizes the secure sockets layer connection, sending the request through the port to the destination in an encrypted form;
   responsive to identifying that the port does not utilize the secure sockets layer connection, determining whether the request requires encryption using the universal resource identifier in the request; and
   responsive to a determination that the request requires the encryption, sending the request through the port to the destination in the encrypted form.

2. The method of claim 1 further comprising:
   receiving a response from a source for routing to a requesting client;
   determining whether an original request for the response was in the encrypted form; and
   responsive to a determination that the original request for the response was in the encrypted form, sending the response to the requesting client in the encrypted form.

3. The method of claim 1, wherein the determining step comprises:
   comparing the universal resource identifier in the request to a set of universal resource identifiers; and
   responsive to a match between the universal resource identifier in the request to a particular universal resource identifier in the set of universal resource identifiers, identifying the response as requiring an encryption.

4. The method of claim 2 further comprising:
   responsive to sending the request to the destination in the encrypted form, recording a connection for the request in a set of connections.

5. The method of claim 4, wherein the determining step comprises:
   identifying the connection for the response; and
   identifying an original response as being in the encrypted form if the connection is in the set of connections.

6. The method of claim 1, wherein the universal resource identifier is a universal resource locator.

7. The method of claim 3, wherein the set of universal resource identifiers is located in a table.

8. The method of claim 1, wherein the method is located in a network appliance.

9. A data processing system for processing outbound traffic passing through a port, the data processing system comprising:
   receiving means for receiving a request from a client for a server at the port, wherein the request includes a universal resource identifier to a destination;
   first identifying means for identifying whether the universal resource identifier to the destination identifies a location on a local area network;
   first sending means, responsive to identifying that the universal resource identifier to the destination identifies a location on a local area network, for sending the request through the port to the destination in an unencrypted form;
   second identifying means for identifying whether the port utilizes a secure sockets layer connection;
   second sending means, responsive to identifying that the port utilizes the secure sockets layer connection, for sending the request through the port to the destination in an encrypted form;
   determining means, responsive to identifying that the port does not utilize the secure sockets layer connection, for determining whether the request requires encryption using the universal resource identifier in the request; and
   third sending means, responsive to a determination that the request requires the encryption, for sending the request through the port to the destination in the encrypted form.

10. The data processing system of claim 9, wherein the determining means is a first determining means, and further comprising:
    second receiving means for receiving a response from a source for routing to a requesting client;
    second determining means for determining whether an original request for the response was in the encrypted form; and
    fourth sending means, responsive to a determination that the original request for the response was in the encrypted form, for sending the response to the requesting client in the encrypted form.

11. The data processing system of claim 9, wherein the determining means comprises:
    comparing means for comparing the universal resource identifier in the request to a set of universal resource identifiers; and
    identifying means, responsive to a match between the universal resource identifier in the request to a particular universal resource identifier in the set of universal resource identifiers, for identifying the response as requiring the encryption.

12. The data processing system of claim 10 further comprising:
    recording means, responsive to sending the request to the destination in the encrypted form, for recording a connection for the request in a set of connections.

13. The data processing system of claim 12, wherein the second determining means comprises:
    first means for identifying the connection for the response; and second means for identifying the original response as being in the encrypted form if the connection is in the set of connections.

14. A non-transitory computer readable medium having a computer program product encoded thereon for processing outbound traffic passing through a port, the computer program product comprising:

instructions for receiving a request from a client for a server at the port, wherein the request includes a universal resource identifier to a destination;

instructions for identifying whether the universal resource identifier to the destination identifies a location on a local area network;

instructions, responsive to identifying that the universal resource identifier to the destination identifies a location on a local area network, for sending the request through the port to the destination in an unencrypted form;

instructions for identifying whether the port utilizes a secure sockets layer connection;

instructions, responsive to identifying that the port utilizes the secure sockets layer connection, for sending the request through the port to the destination in an encrypted form;

instructions, responsive to identifying that the port does not utilize the secure sockets layer connection, for determining whether the request requires encryption using the universal resource identifier in the request; and instructions, responsive to a determination that the request requires the encryption, for sending the request through the port to the destination in the encrypted form.

15. The non-transitory computer readable medium of claim 14 further comprising:

instructions for receiving a response from a source for routing to a requesting client;

instructions for determining whether an original request for the response was in the encrypted form; and instructions, responsive to a determination that the original request for the response was in the encrypted form, for sending the response to the requesting client in the encrypted form.

16. The non-transitory computer readable medium of claim 14, wherein the instructions for determining whether the request requires encryption using the universal resource identifier in the request comprises:

first sub instructions for comparing the universal resource identifier in the request to a set of universal resource identifiers; and second sub instructions, responsive to a match between the universal resource identifier in the request to a particular universal resource identifier in the set of universal resource identifiers, for identifying the response as requiring the encryption.

17. The non-transitory computer readable medium of claim 15 further comprising:

instructions, responsive to sending the request to the destination in the encrypted form, for recording a connection for the request in a set of connections.

18. The non-transitory computer readable medium of claim 17, wherein the instructions for determining whether the original request for the response was in the encrypted form comprises:

first sub instructions for identifying the connection for the response; and second sub instructions for identifying the original response as being in the encrypted form if the connection is in the set of connections.

19. The non-transitory computer readable medium of claim 14 wherein the universal resource identifier is a universal resource locator.

* * * * *